United States Patent [19]

Ondis

[11] Patent Number: 4,643,454

[45] Date of Patent: Feb. 17, 1987

[54] LOTTERY TICKET

[75] Inventor: Albert W. Ondis, North Kingstown, R.I.

[73] Assignee: Astro-Med, Inc., West Warwick, R.I.

[21] Appl. No.: 819,109

[22] Filed: Jan. 14, 1986

[51] Int. Cl.⁴ .................. G09C 3/00; G01D 15/00; B42D 15/00; B41L 1/20

[52] U.S. Cl. .................. 283/74; 283/99; 283/903; 282/11.5 R; 346/163

[58] Field of Search .................. 283/74, 84, 95, 99, 283/108, 111, 901, 903; 346/76 PH, 163, 136.1; 428/402.24; 282/11.5 R

[56] References Cited

U.S. PATENT DOCUMENTS

| | | | |
|---|---|---|---|
| 3,789,425 | 1/1974 | Matsushima | 346/163 |
| 3,861,952 | 1/1975 | Tokumoto et al. | 346/163 |
| 3,945,870 | 3/1976 | Johnsen | 283/903 |
| 4,299,637 | 11/1981 | Oberdeck et al. | 283/99 |
| 4,305,082 | 12/1981 | Kusakawa | 346/76 PH |
| 4,460,676 | 7/1984 | Fabel | 282/11.5 R |

FOREIGN PATENT DOCUMENTS

| | | | |
|---|---|---|---|
| 1275929 | 6/1972 | United Kingdom | 346/76 R |

*Primary Examiner*—Paul A. Bell
*Assistant Examiner*—Paul M. Heyrana, Sr.
*Attorney, Agent, or Firm*—Salter & Michaelson

[57] ABSTRACT

An instant-game-type lottery ticket comprises a card having a coating on the front side thereof which includes a first metallic layer and an outwardly facing layer of thermally responsive chemicals, a removable opaque layer over at least a portion of the thermally responsive chemical layer and a second metallic layer on the back side of the card. The metallic layers preferably comprise vacuum deposited silver-colored metallized layers having protective transparent plastic films thereon. Game-playing indicia can be imprinted on the lottery ticket at the point of sale without damaging the removable opaque layer by selectively activating the thermally responsive chemicals under the removable opaque layer with a thermal printhead. The transparent plastic films allow the card to be thermally imprinted with a thermal printhead without damaging the printhead and the metallized layers add opacity to the lottery ticket.

4 Claims, 5 Drawing Figures

LOTTERY TICKET

BACKGROUND AND SUMMARY OF THE INVENTION

The instant invention relates to lottery games, and more particularly to a lottery ticket which is imprintable with gameplaying indicia at the point of sale.

Lottery tickets of the type known as instant-game tickets comprising a card having game-playing indicia imprinted on a window thereon and a removable opaque layer covering the window have been available for a number of years. Further, lottery tickets of this general type have been found to be extremely popular since they allow game players to immediately determine whether or not their tickets are winning tickets. Specifically, a purchaser of a lottery ticket of this general type can scratch off the removable opaque layer covering the window thereon with a coin or the like to immediately determine whether or not the game-playing indicia in the window represents a winning combination which entitles the ticket holder to a predetermined prize. It has also been found that although instant-game-type lottery tickets having various different appearances have been heretofore available, those having silver-colored layers on the front and back surfaces thereof have had the greatest appeal. However, while lottery tickets of this general type have been extremely popular with game players, they have created certain problems for those involved in the administration and sale of lottery tickets. Specifically, it has been found that because the heretofore available lottery tickets of this general type have been preprinted with game-playing indicia, they have inherently had cash values which have corresponded to their prices as lottery tickets; and hence, it has been necessary for venders to treat tickets of this type as currency. In addition, it has been found that because tickets of this type have been preprinted with game-playing indicia, vendors thereof have frequently been tempted to determine whether or not the tickets in their possession are winning tickets before they are sold. For example, vendors have been known to utilize high intensity lamps and even X-ray equipment to read the indicia imprinted on lottery tickets without removing the removable opaque layers which cover the indicia. Accordingly, while the heretofore available instantgame-type tickets of the above described type have proven to be highly popular with game players, the administration and handling of tickets of this type has been a problem.

The lottery tickets and articles disclosed in the U.S. patents to SANDEN, U.S. Pat. No. 3,930,673; KOZA, U.S. Pat. No. 4,174,856; and CARRIER et al, U.S. Pat No. 4,273,362, are generally exemplary of the types of articles which may be embodied as lottery tickets but which must be preprinted with concealed indicia. However, while the articles disclosed in these patents represent the closest patented prior art to the instant invention of which the applicant is aware, they all have the hereinabove described disadvantages of preprinted lottery tickets.

While the concept of providing instant-game-type lottery tickets which can be effectively imprinted with game-playing indicia at the point of sale has previously been proposed, an effective solution to this problem has not been heretofore available. In this connection, it has previously been proposed to apply thermal printing techniques to imprint game-playing indicia on instant-game-type tickets of this general type after the removable opaque layers have been applied thereto. However, in the only known previous attempt to make lottery tickets having thermally imprinted indicia thereon, the cards which were utilized did not have sufficient opacity; and as a result, it was possible to read the thermally imprinted game-playing indicia on the cards without damaging the removable opaque layers thereon by holding the cards up to intense light sources or by utilizing X-ray equipment. Further, although it has been recognized that the public generally prefers lottery tickets comprising cards having metallic silver-colored coatings on both the front and back surfaces thereof, it has generally not been considered to be possible to construct cards of this type for thermal printing applications. In this regard, it has generally been known that the metallic layers which are utilized for producing silver-colored coatings on cards are prone to oxidation, and it has also generally been known that many metallic oxides are highly abrasive and can therefore be extremely damaging to the relatively delicate printheads of thermal printers. For example, when aluminum is utilized in the metallic coatings on the surfaces of lottery tickets, aluminum oxide can be formed on the surfaces of the tickets; and since aluminum oxide is an extremely hard and abrasive material, it has been assumed that it would quickly damage the printheads of thermal printers. Hence, while the benefits of providing lottery tickets which can be thermally imprinted with game-playing indicia at the point of sale and which have silver-colored coatings on the front and back surfaces thereof have generally been recognized, an effective lottery ticket embodying these characteristics has not been heretofore available.

The instant invention provides an effective instant game-type lottery ticket which can be effectively imprinted with game-playing indicia at the point of sale. Further, the lottery ticket of the instant invention has sufficient opacity to prevent dishonest vendors from reading the indicia thereon, and the lottery ticket can be embodied with silver-colored coatings on the front and back surfaces thereof in order to make it more attractive and desirable from a marketing standpoint. Specifically, the lottery ticket of the instant invention comprises a card having a front side and a back side, a coating on the front side of the card comprising a first opaque silver-colored metallic layer in at least a portion of the coating, and an outwardly facing layer of a thermally responsive chemical in at least a portion of the coating, a removable opaque layer on at least a portion of the chemical layer, and a second opaque silver-colored metallic layer on the back side of the card in at least the area thereof which is opposite from the removable opaque layer. The removable opaque layer is preferably made of a latex material, it is removable by scratching it with a coin or the like, and it has a melting point which is greater than the response temperature of the thermally responsive chemical; and accordingly the removable opaque layer can easily be removed by a game player, but it is not damaged by a thermal printhead when the printhead is utilized for imprinting indicia on the chemical layer behind the removable opaque layer. In a first embodiment of the lottery ticket, the first silver-colored metallic layer is applied on the front side of the card, and the thermally responsive chemical layer is applied over the metallic layer so that when portions of the thermally responsive chemical layer are activated, game-playing indicia are imprinted on the silver-colored metallic layer. In this embodiment, the first silver-colored metallic layer preferably comprises a vacuum deposited silver-colored metallized layer which is preferably made of vacuum-deposited aluminum, and a first transparent film over the metallized layer which protects the metallized layer and which also protects a thermal printhead from being damaged by metallic oxides therefrom. The second silver-colored metallic layer preferably also comprises a vacuum-deposited silver-colored metallized layer and a transparent plastic film over the metallized layer. In a second embodiment of the lottery ticket, the first silver-colored metallic layer on the front side of the card is formed with a window therein, the thermally responsive chemical is applied in the window, and the removable opaque layer is applied over the thermally responsive chemical in the window. In this embodiment, the silver-colored metallic layer on the front side of the card preferably also comprises a vacuum-deposited silvercolored metallized layer, preferably an aluminum metallized layer, and a transparent plastic film over the metallized layer. The second silver-colored metallic layer on the back side of the card preferably also comprises a vacuum-deposited silver-colored metallized layer and a transparent plastic film over the metallized layer.

Accordingly, the lottery ticket of the instant invention effectively overcomes the disadvantages of many of the heretofore available instant-game-type lottery tickets. Specifically, the lottery ticket of the instant invention can be effectivley imprinted with game-playing indicia at the point of sale so that it has little or no value before it is imprinted and so that venders are not tempted to try to read the game-playing indicia before the card is sold. Further, the lottery ticket of the instant invention comprises an opaque metallic layer on the back surface thereof which prevents persons from reading the game-playing indicia on the lottery ticket without removing the removable opaque layer. Still further, in the preferred embodiment of the lottery ticket of the instant invention, the metallic layers on the front and back surfaces of the card are covered with plastic films to protect the metallized layers and also to prevent oxides from the metallized layers from damaging a thermal printhead utilized for imprinting indicia on the lottery ticket.

Accordingly, it is a primary object of the instant invention to provide an improved instant-game-type lottery ticket.

Another object of the instant invention is to provide an instant-game-type lottery ticket which can be effectively imprinted with game-playing indicia at the point where it is sold to a customer.

A still further object of the instant invention is to provide an opaque lottery ticket which can be thermally imprinted with game-playing indicia without damaging a thermal printhead utilized for imprinting the indicia.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention.

DESCRIPTION OF THE INVENTION

Figure 1:
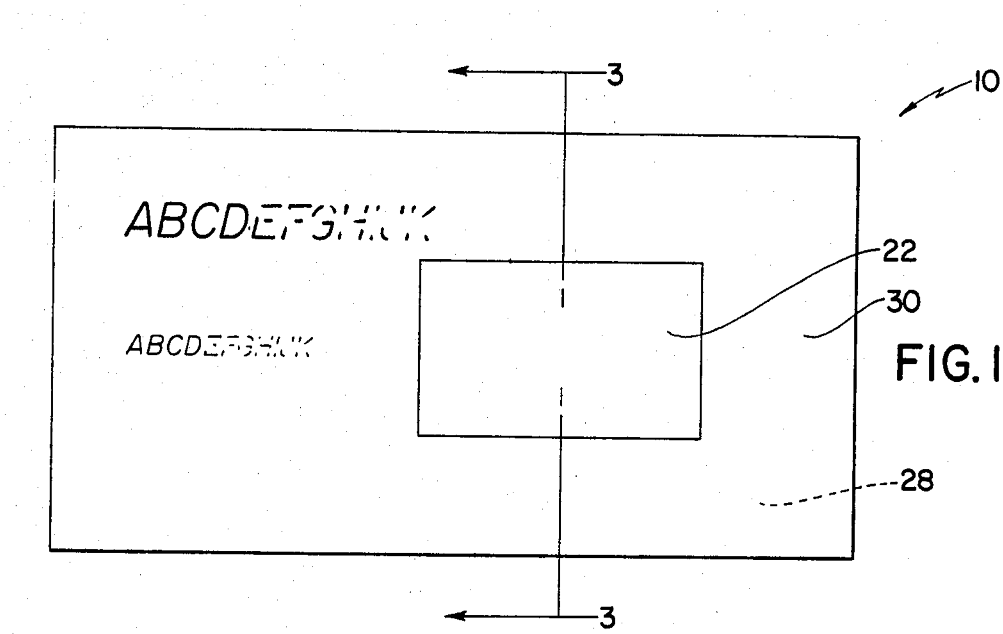
FIG. 1 is a plan view of the front side of a first embodiment of the lottery ticket of the instant invention.
Figure 2:
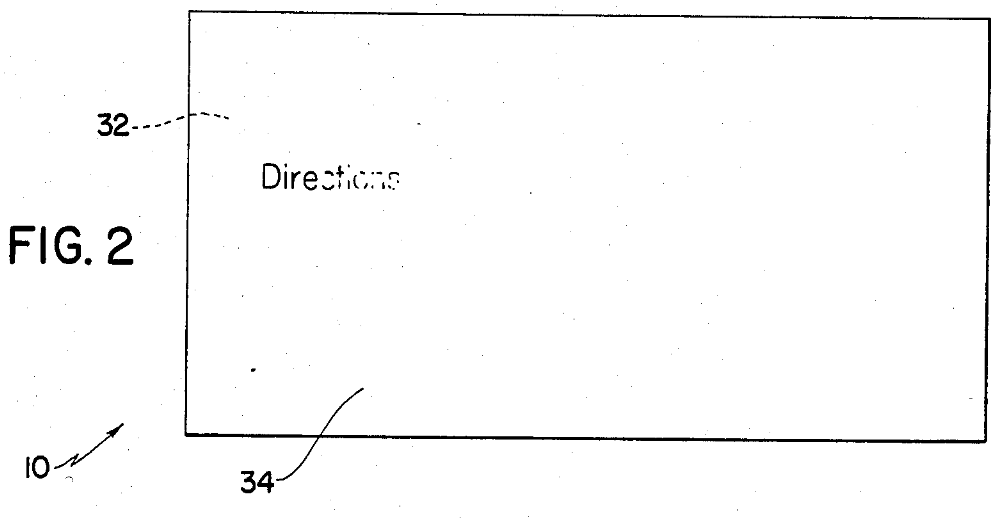
FIG. 2 is a plan view of the rear side thereof.
Figure 3:
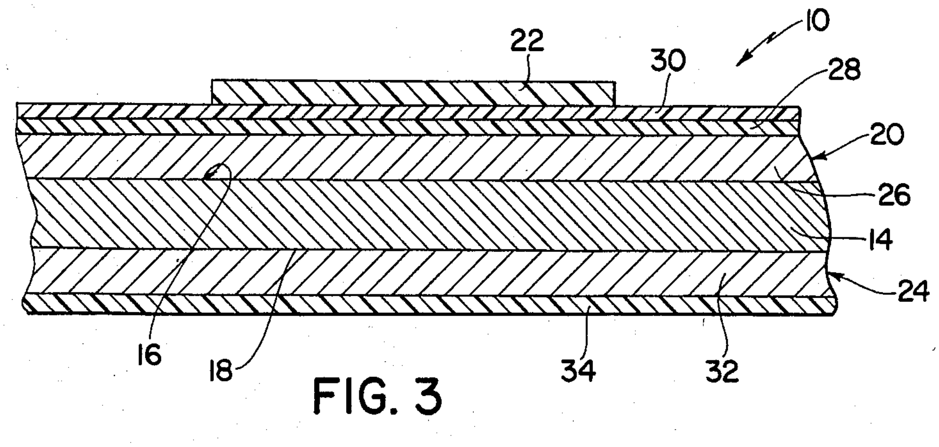
FIG. 3 is a sectional view taken along line 3—3 in FIG. 1.
Figure 4:
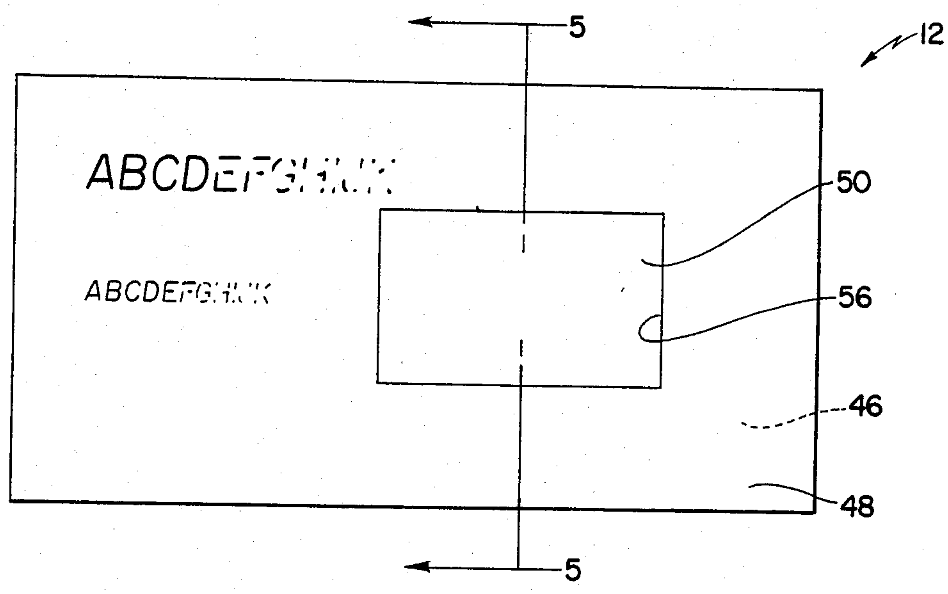
FIG. 4 is a plan view of the front side of a second embodiment of the lottery ticket.
Figure 5:
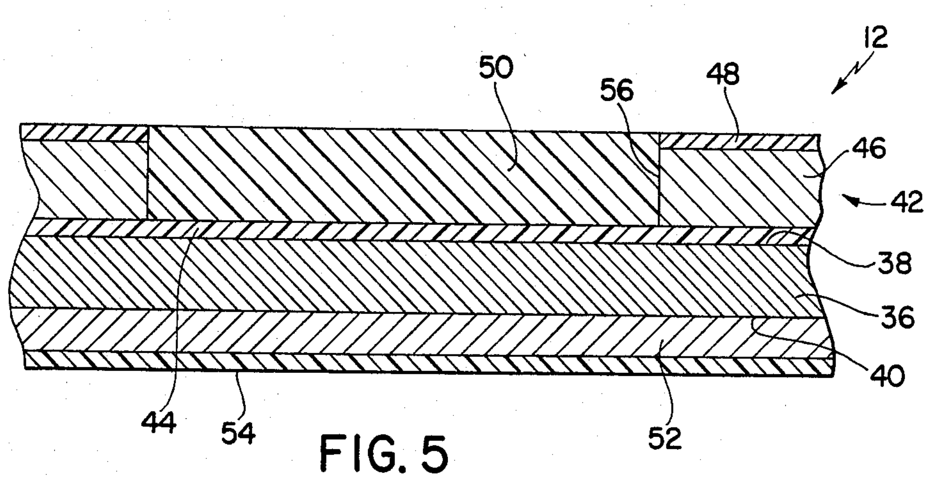
FIG. 5 is a sectional view taken along line 5—5 in FIG. 4.

Referring now to the drawings, a first embodiment of the lottery ticket of the instant invention is illustrated in FIGS. 1-3 and generally indicated at 10; and a second embodiment of the lottery ticket of the instant invention is illustrated in FIGS. 4 and 5 and generally indicated at 12. The lottery tickets 10 and 12 are both instant-game-type lottery tickets, and they are adapted to be imprinted with game-playing indicia by means of a thermal printer at the point of sale as will hereinafter be more fully set forth.

The lottery ticket 10 comprises a card 14 having a front side 16 and a rear or back side 18, a coating 20 on the front side 18, a removable opaque layer 22 on a portion of the coating 20, and a coating 24 on the back side 18. The card 14 preferably comprises a sheet of between 10 and 14 point card stock. The coating 20 on the front side 16 comprises a silver-colored metallic layer comprising a first metallized layer 26 which is applied on the front side 16 and a first transparent plastic film 28 on the outer surface of the layer 26. The first metallized layer 26 preferably comprises a metal, such as aluminum or zinc, which is applied to the card 14 by vacuum deposition, and the first transparent plastic film 28 preferably comprises a polyester film or a lithographic varnish which is applied to the first metallized layer 26 to provide a protective outer covering therefor. The coating 20 further comprises a chemical layer 30 which comprises a conventional thermally responsive chemical of the type utilized in conventional heat sensitive recording papers, such as the chemicals and recording papers disclosed in the U.S. Patent to MORISHITA et al, U.S. Pat. No. 4,520,376. In this connection, the chemicals 30 are preferably transparent when they are applied to the first transparent layer or film 28, and they are responsive to the selective application of thermal energy thereto so that they become visible in localized areas where the energy is applied. Accordingly, when a thermal printhead is utilized to apply localized thermal energy to the chemicals in the layer 30, preselected indicia can be imprinted on the lottery ticket 10. The removable opaque layer 22 preferably comprises an opaque layer of an easily removable material, such as a latex material of the type utilized in conventional instant-game-type lottery tickets which are currently available in many lotteries. In this connection, the removable opaque layer 22 comprises a material having a melting point which is higher than the thermal response temperature of the chemicals in the layer 30 so that the layer 22 is not melted when the chemicals 30 are thermally activated. The layer 22 is, however, preferably easily removable, such as by scratching with a coin or the like, to expose indicia imprinted on the layer 30 behind the layer 22. The layer 22 is preferably only applied in a preselected portion of the lottery ticket 10 where game-playing indicia are to be applied via the chemicals 30 as illustrated in FIG. 1. The coating 24 on the back side 18 of the card 14 preferably comprises a metallic silver-colored coating comprising a second metallized layer 32 on the back side 18 and a second transparent protective layer 34 on the outer surface of the layer 32. The layer 32 is preferably opaque to light and most X-rays, and it preferably comprises a metallized layer of a metal, such as aluminum or zinc, and it is preferably applied to the back side 18 by conventional vacuum deposition techniques, although the use of other types of metallic layers for the layers 26 and 32, such as silver-ink layers, is contemplated. The second layer 34 preferably comprises a transparent plastic material, such as a polyester film or a lithographic varnish, and it is applied over the second metallized layer 32 to provide a protective outer covering therefor and to prevent oxidized particles of the second layer 32 from damaging a thermal printhead. For use of the lottery ticket 10, it is supplied to a vender without the necessary gameplaying indicia on the portion of the transparent plastic film 28 which is beneath the removable opaque layer 22, although instructions, etc., can be preprinted on both of the first and second transparent layers or films 28 and 34. Thereafter, when a purchaser purchases the ticket 10, a thermal printer which is electronically controlled through a central lottery computer terminal operates to selectively thermally energize portions of the chemical layer 30 which are beneath the removable opaque layer 22 so that predetermined game-playing indicia are imprinted on the transparent film 28. In this connection, the first and second transparent films or layers 28 and 34 protect the thermal printhead from abnormal damage due to abrasion from oxidized particles of the first and second metallized layers 26 and 32. In addition, the second metallized layer 32 on the back side 18 of the card 14 renders the card 14 opaque to light and most X-rays. In any event, once the card 10 has been sold to a purchaser, the purchaser can easily remove the removable opaque layer 22 to expose the game-playing indicia imprinted in the chemicals 30 on the layer 28 so that the purchaser can determine whether or not he or she is a game winner.

The lottery ticket 12 is illustrated in FIGS. 4 and 5 and it comprises a card 36 which is preferably similar to the card 14 and has a front side 38 and a back or rear side 40, a coating 42 on the front side 38 comprising a layer 44 of thermally responsive chemicals, a first metallized layer 46 and a first transparent plastic layer 48, and an outwardly exposed removable opaque layer 50 on at least a portion of the chemical layer 44. The lottery ticket 12 further comprises a second coating on the rear side 40 comprising a second metallized layer 52 and a second transparent plastic layer 54. The thermally responsive chemical layer 44 preferably comprises a layer of chemicals similar to those of the type utilized for the thermally responsive layer 30 in the lottery ticket 10, although it will be understood that the chemicals may be absorbed or impregnated into the card 36 to varying degrees. The first and second metallized layers 46 and 52 preferably comprise layers of silver-colored metals, such as aluminum or zinc, which are applied to their respective surfaces by vacuum deposition, although the use of other types of metallized layers is contemplated. In this regard, a portion of the front side of the card 36 is preferably masked to define a window 56 thereon for receiving the removable opaque layer 50 during the application of the first metallized layer 46 thereto. The first and second transparent plastic layers 48 and 54 preferably comprise layers of transparent plastic materials, such as polyester films, or lithographic varnishes. The removable opaque layer 50 is applied on the front side of the card 36 in the window 56 over the portion of the thermally responsive chemical layer 44 which is located in the window 56. The removable layer 50 preferably comprises an opaque removable material of the type utilized in conventional instant-game-type lottery tickets, and it has a melting point which is greater than the response temperature of the chemicals in the thermally responsive layer 44.

For use of the lottery ticket 12, indicia is imprinted on the front surface 38 by thermally energizing the chemicals in the thermally responsive chemical layer 44 through the removable opaque layer 50. Accordingly, indicia can be imprinted on the card 36 at the point of sale, and a purchaser can immediately remove the removable opaque layer 50 in order to determine whether or not the lottery ticket 12 is a winning ticket. In this connection, the metallized layer 52 makes the lottery ticket 12 opaque to light and most X-rays, and the first and second transparent plastic layers 48 and 54 protect their respective first and second metallized layers 46 and 52, and they also prevent damage to a thermal printhead utilized for printing indicia on the lottery ticket 12.

It is seen, therefore, that the instant invention provides a significant improvement in instant-game-type lottery tickets. The tickets 10 and 12 can be effectively imprinted with game-playing indicia at the point of sale, and they are also highly opaque to light and most X-rays. Further, the tickets 10 and 12 can be effectively imprinted with a thermal printhead without causing damage to the printhead. Accordingly, for these reasons as well as the other reasons hereinabove set forth, it is seen that the instant invention represents a significant advancement in the art, which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A thermally imprintable ticket for use in lotteries comprising a card having a front side and a back side, a coating on the front side of said card, said coating comprising a first metallic layer extending over at least a portion of said card, a first transparent plastic film layer extending over said first metallic layer and an outwardly facing layer of a thermally responsive chemical extending over at least a portion of said film, an opaque removable layer extending over at least a portion of said thermally responsive chemical layer, said removable layer being easily removable to expose said thermally responsive chemical layer and having a melting point which is greater than the response temperature of said thermally responsive chemical to enable game playing indicia to be thermally imprinted in said thermally responsive chemical layer through said removable layer without altering the appearance of said removable layer, and an opaque second metallic layer extending over the back side of said card in at least the area thereof which is opposite said removable layer.

2. In the lottery ticket of claim 1, said second metallic layer comprising a vacuum deposited silver-colored metallized layer and a transparent plastic film over said metallized layer.

3. In the lottery ticket of claim 1, said second metallic layer comprising a second vacuum deposited silver-colored metallized layer and a transparent plastic film over said second metallized layer.

4. A thermally imprintable ticket for use in lotteries comprising a card having a front side and a back side, a coating on the front side of said card, said coating comprising a first metallic layer extending over at least a portion of said card and having a window therein, a first transparent plastic film layer extending over said first metallic layer, and a layer of a thermally responsive chemical in said window, an opaque removable layer extending over at least a portion of said thermally responsive chemical layer, said removable layer being easily removable to expose said thermally responsive chemical layer and having a melting point which is greater than the response temperature of said thermally responsive chemical to enable game playing indicia to be thermally imprinted in said thermally responsive chemical layer through said removable layer without altering the appearance of said removable layer, and an opaque second metallic layer extending over the back side of said card in at least the area thereof which is opposite said window.

* * * * *